United States Patent
Reimer et al.

(10) Patent No.: US 7,339,370 B2
(45) Date of Patent: Mar. 4, 2008

(54) POSITION AND TORQUE SENSOR

(75) Inventors: Lawrence B. Reimer, Janesville, WI (US); Daniel Russell Reneau, Madison, WI (US)

(73) Assignee: Bourns, Inc., Riverside, CA (US)

( * ) Notice: Subject to any disclaimer, the term of this patent is extended or adjusted under 35 U.S.C. 154(b) by 0 days.

(21) Appl. No.: 11/299,156

(22) Filed: Dec. 9, 2005

(65) Prior Publication Data

US 2007/0132447 A1    Jun. 14, 2007

(51) Int. Cl.
*G01B 7/30* (2006.01)
*G01R 33/09* (2006.01)

(52) U.S. Cl. .............................. 324/207.25; 324/207.21

(58) Field of Classification Search ...............................
324/207.24–207.25, 207.21, 173–174; 73/514.31, 73/514.39
See application file for complete search history.

(56) References Cited

U.S. PATENT DOCUMENTS

| | | | |
|---|---|---|---|
| 4,791,366 A | 12/1988 | Suzuki et al. | |
| 4,810,967 A * | 3/1989 | Yokoyama et al. | ...... 324/207.2 |
| 5,880,586 A | 3/1999 | Dukart et al. | |
| 6,018,318 A | 1/2000 | Schodlbauer | |
| 6,104,185 A | 8/2000 | Lamm et al. | |
| 6,250,420 B1 | 6/2001 | Brenner et al. | |
| 6,324,905 B2 | 12/2001 | Noltemeyer et al. | |
| 6,433,535 B1 | 8/2002 | Marx et al. | |
| 6,466,889 B1 | 10/2002 | Schodlbauer | |
| 6,507,188 B1 | 1/2003 | Dilger et al. | |
| 6,515,471 B1 | 2/2003 | Santos | |
| 6,616,688 B2 | 9/2003 | Von Oepen | |
| 6,720,762 B2 | 4/2004 | Okumura | |
| 6,763,733 B2 | 7/2004 | Tokumoto | |
| 7,112,962 B2* | 9/2006 | Ricks et al. | ................ 324/252 |
| 2002/0118011 A1* | 8/2002 | Wolf | ....................... 324/207.2 |
| 2003/0145663 A1* | 8/2003 | Heisenberg et al. | ... 73/862.324 |
| 2004/0207392 A1* | 10/2004 | Kernhof | ............... 324/207.25 |
| 2005/0253578 A1* | 11/2005 | Kawashima et al. | ... 324/207.25 |

* cited by examiner

*Primary Examiner*—Bot LeDynh
(74) *Attorney, Agent, or Firm*—Michael Best & Friedrich LLP

(57) ABSTRACT

A sensor having a first array of N magnetic pole pairs, where N is a positive number, and a second array of M magnetic pole pairs, arranged substantially in parallel to the first array, where M is a positive number different from N, such as N−1 or N+1. A first magnetic pole in the second array is aligned with a first magnetic pole in the first array. The remaining magnetic poles in the second array are arranged such that each one of them is positioned with respect to at least one pole in the first array to form a magnetic field with an angular orientation with respect to the two poles. This arrangement of magnetic pole pairs can be used to measure absolute position. A third array of M magnetic pole pairs may be arranged substantially in parallel with the second array. The second and third arrays of magnetic pole pairs may be used to measure relative position between the two arrays.

13 Claims, 5 Drawing Sheets

Relative Position Sensing

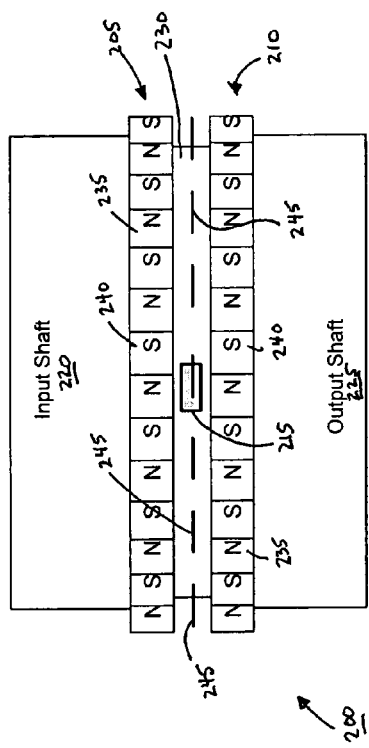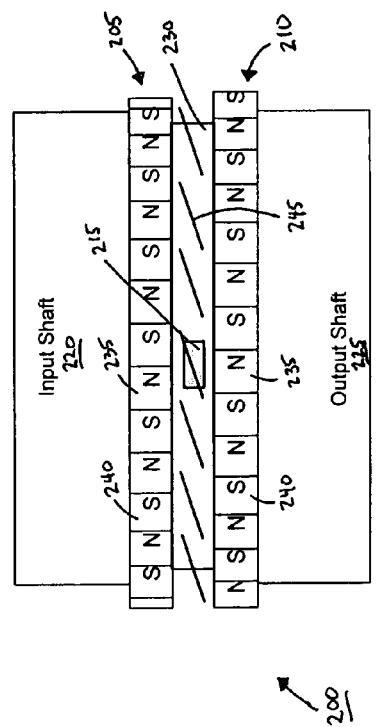

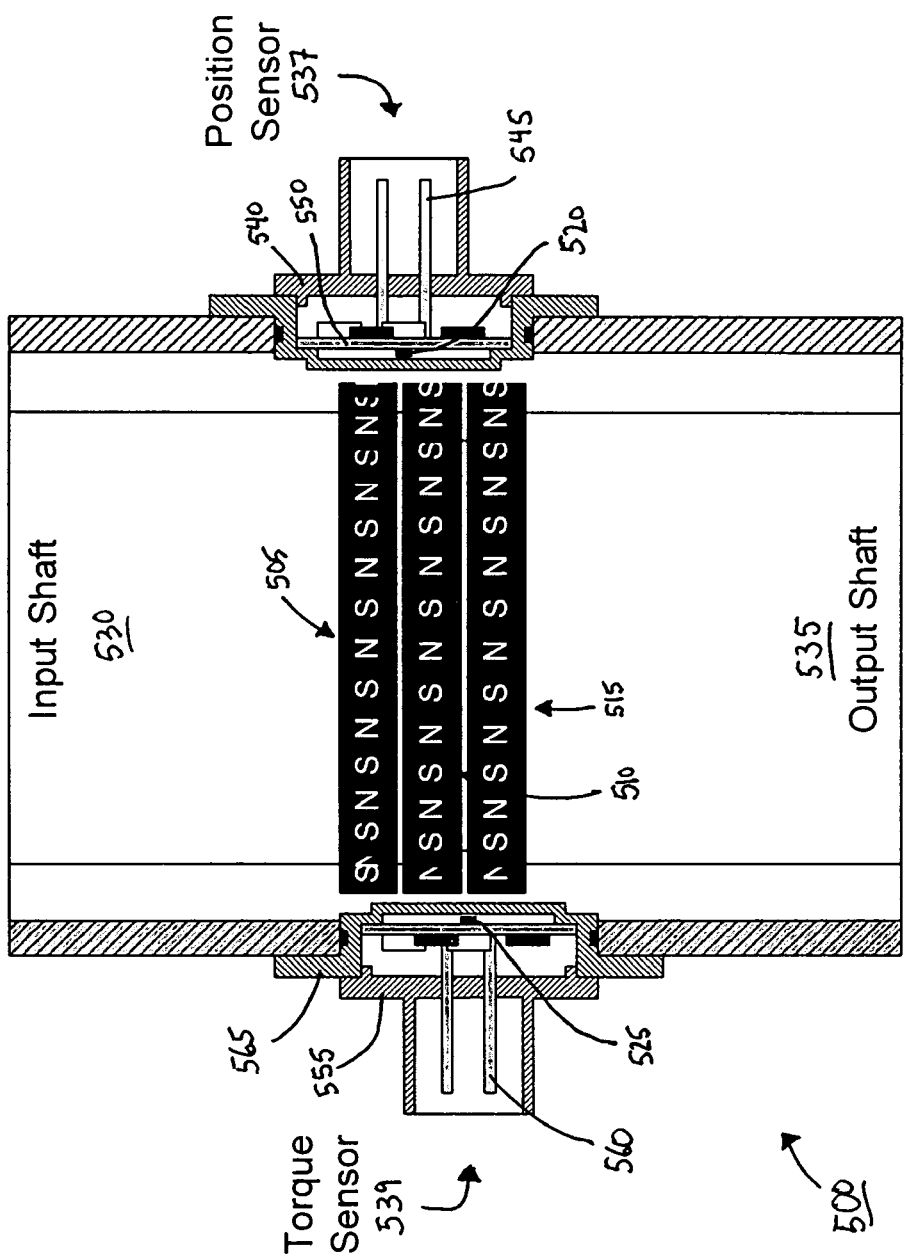

POSITION AND TORQUE SENSOR

BACKGROUND

The present invention relates to field sensors and, in particular, to magnetic sensors for determining position and torque.

Magnetic sensing for determining a position or speed of a moving component is known and is used in applications such as power steering, braking, and motor control systems. Motor position sensing and steering wheel position sensing are similar in at least one way: access to the end of the moving shaft is generally limited or non-existent because the end of the shaft is connected to operating components. Thus, sensing is usually performed at the side of the shaft. For instance, a target magnet positioned on a shaft can be detected with a magnetic sensing element or sensor positioned concentric to the longitudinal axis of the shaft. In one application, the sensor may include components configured to count the number of times the shaft rotates. In a different application, the position of the shaft may be determined using several target magnets.

Resolvers and encoders are often used to process the raw information generated by the magnetic components. Resolvers provide an absolute output signal and encoders provide a relative output signal. The absolute nature of the signal from a resolver is desirable, but resolvers are often complex and expensive. Encoders are, in general, simpler and cheaper than resolvers, but can be inaccurate. In some cases, error detection hardware is used with encoders, but this adds complexity.

SUMMARY

Accordingly, improved magnetic and field sensors are desirable. For example, current automotive steering systems appear to lack a torsion detector and position detector that directly measures the position of the wheel and the torque applied to the wheel simultaneously.

One embodiment the invention provides for a relative angular displacement sensor. The relative angular displacement sensor includes a first array of N magnetic pole pairs where N is a positive number. The sensor also includes a second identical array of N magnetic pole pairs arranged substantially in parallel to the first array. The sensor also includes a magnetic field direction sensor element, such as an anisotropic magnetoresistive ("AMR") sensor, positioned above and between the first array and the second array.

The sensor may be used in different relative angular displacement sensing applications. For example the first array may be positioned on an input shaft of a steering torque sensing assembly and the second array may be positioned on an output shaft. The field sensor may be located to sense the relative angular position between the two arrays and ultimately the relative angular position of one shaft with respect to the other.

In another embodiment, the invention provides for an absolute position sensor. The absolute position sensor includes a first array of N magnetic pole pairs, where N is a positive number. The sensor also includes a second array of M magnetic pole pairs, where M is a positive number equal to N−1 or N+1. The second array is arranged substantially in parallel to the first array, and mechanically coupled to the first array. The sensor also includes a magnetic field direction sensor element, such as an AMR sensor, positioned above and between the first array and the second array.

The sensor may be used in different absolute position sensing applications. For example, the mechanically coupled first and second arrays may be positioned on a steering shaft with a field sensor located between the two arrays to sense the absolute rotational position of the steering shaft.

In another embodiment, the invention provides an absolute angular position and relative angular displacement sensor. The absolute angular position and relative angular displacement sensor includes a first array of N magnetic pole pairs, where N is a positive number; and an identical second array of N magnetic pole pairs and a third array of M magnetic pole pairs, arranged substantially in parallel to, and mechanically coupled to the second array, where M is a positive number equal to either N−1 or N+1. A first field sensor is positioned above and between the first array and the second array, and a second field sensor is positioned above and between the second and third array. The first and second field sensors may be an AMR sensor or an array of AMR sensors.

Other aspects of embodiments of the invention will become apparent by consideration of the detailed description and accompanying drawings.

BRIEF DESCRIPTION OF THE DRAWINGS

FIG. 2A illustrates a relative angular displacement sensing system for measuring torque.

FIG. 2B illustrates another embodiment of the relative angular displacement sensing system for measuring torque as shown in FIG. 2A.

FIG. 5 illustrates a position and torque sensing system.

DETAILED DESCRIPTION

Before embodiments of the invention are explained in detail, it is to be understood that the embodiments described are not limited to the details of construction and the arrangement of components set forth in the following description or illustrated in the following drawings, which are provided as examples. Embodiments can take other forms and be used in other applications.

Figure 1A:
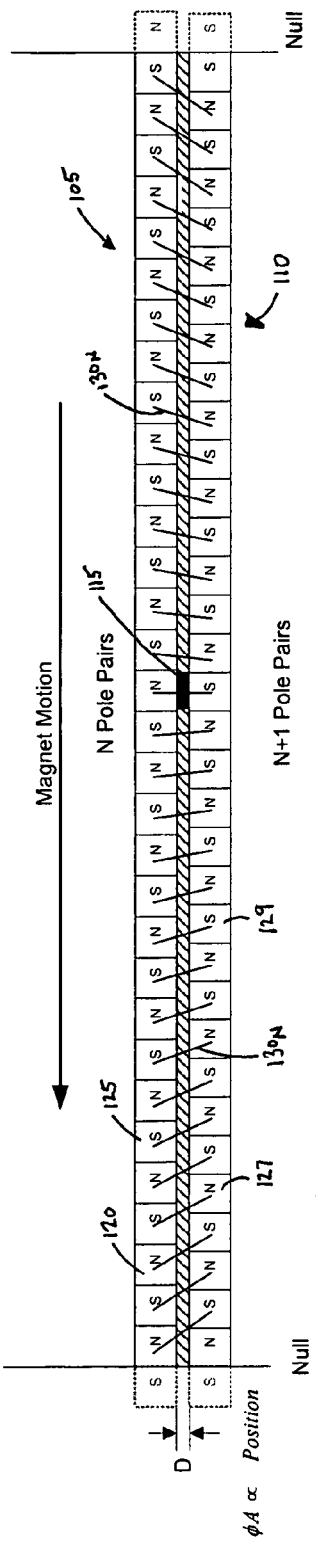
FIG. 1A illustrates an absolute linear position sensing system.

FIG. 1A illustrates an exemplary absolute linear position sensing system 100. The absolute linear position sensing system 100 includes a first magnetic array 105, a second magnetic array 110, and a magnetic field or field sensor 115. The field sensor may be a type of magnetoresistive sensor such as an AMR sensor. An array of AMR sensors can also be used. The first magnetic array 105 and second magnetic array 110 are mechanically coupled to each other to move as a single unit. The field sensor 115 is positioned between the magnetic arrays 105 and 110, and senses a differential magnetic field created between the two arrays 105 and 110, as described in greater detail below. The position sensing system 100 can also include processing components (such as those shown in FIG. 5), which are capable of receiving and processing signals from the field sensor 115.

The first magnetic array 105 includes "N" magnetic pole pairs. Each pole pair includes a north pole 120 and a south pole 125. The second magnetic array 110 includes "M" magnetic pole pairs. M is a number that is different from N, which can be equal to N+1 or N−1. In the embodiment shown, M is equal to N+1. The magnetic pole pairs of the second magnetic array 110 also include north and south poles, designated with reference numerals 127 and 129. Although, it is possible to align at least one magnetic pole in the second magnetic array 110 to a corresponding and opposite magnetic pole in the first magnetic array 105, the difference in the number of poles (e.g., either N+1 or N−1) in the second array 110 creates a misalignment between the other poles. This pole misalignment creates a differential magnetic field direction $130_N$ which varies proportionally with position along the face of the magnetic array. In other words, the field between the arrays changes orientation in respect to position. The differential magnetic field direction $130_N$ between each of the opposite poles of the magnetic arrays 105 and 110 is unique and discrete, and is established according to the +1 difference in pole spacing between each magnetic array. The unique nature of the field direction allows positional sensing to be accomplished using a field sensor, as is described in more detail below.

In the embodiment shown, the magnetic arrays 105 and 110 are spaced apart a distance D, but positioned substantially parallel to one another. The magnetic arrays should be positioned sufficiently close to one another to create a field that can be detected by the field sensor 115. In most instances, the magnetic field strength of each magnet in the arrays 105 and 110 is a consideration in determining the distance between the arrays. In general, the stronger the magnets used in the arrays, the larger the distance D between the arrays may be. In one embodiment, the distance D is approximately 1 millimeter ("mm"). In other embodiments, the arrays may be positioned closer or farther apart.

The field sensor 115 is positioned between and spaced from the arrays 105 and 110. In the embodiment shown, the field sensor 115 is positioned above the arrays a certain distance. In one embodiment, this distance is 1.7 mm. However, it is possible to locate the field sensor 115 at different distances and in a position that is adjacent to the arrays, but not above them. The magnetic field sensor measures the angle of the magnetic field direction $130_N$. As the first and second magnetic arrays 105 and 110 change position with respect to the field sensor 115, the magnetic field $130_N$ alternates between Ø and Ø+180 with each pole pair. In addition, the field angle Ø shifts linearly from a minimum level of −β at a null point, to a maximum of +β when the null point is reached at an opposing end of the magnetic arrays 105 and 110 where −90<β<90. The orientation of the field lines for the differential magnetic field $130_N$ shown in FIG. 1A represents the approximate magnetic fields between the two magnetic arrays 105 and 110.

As noted above, the field sensor 115 can take the form of an AMR sensor or array of AMR sensors. Some AMR sensors can not detect the difference between a field angle of Ø and that of Ø+180. As a result, when such AMR sensors are used, the output of the magnetic field sensor 115 is not affected by the alternating polarity changes, or the changing boundary conditions at the north and south pole interfaces. However, an AMR sensor can be configured to detect the absolute field angle difference described above. For example, in one embodiment, the field sensor 115 is a four-element sin/cos AMR sensor. The four elements provide a device that bridges the length of a single magnetic pole on the magnetic array 105 and 110. Thus, as Ø varies over each magnetic pole pair combination, the discrete value of Ø can be used as an indication of position along the length of the magnetic arrays 105 and 110. Using an AMR field sensor whose output is averaged over a sufficient distance can help to avoid magnetic field dropouts or losses that are caused by field variations (e.g., changing boundary conditions at north and south pole interfaces).

Figure 1B:
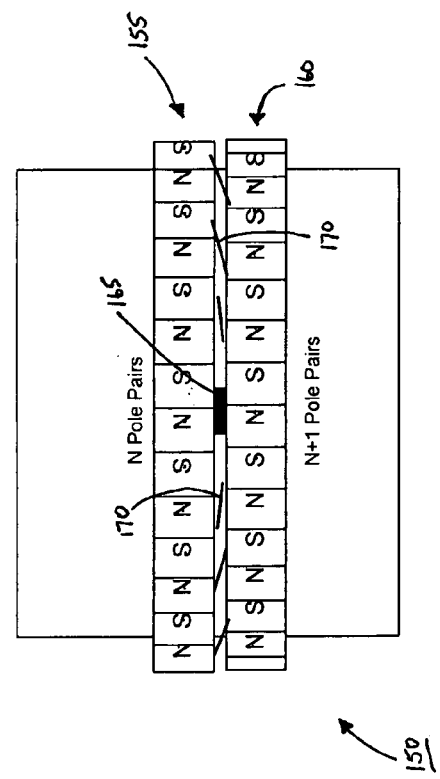
FIG. 1B illustrates an absolute angular position sensing system.

FIG. 1B illustrates an exemplary absolute angular position sensing system 150. The absolute angular position sensing system 150 includes a first magnetic array 155, a second magnetic array 160, and a magnetic field or field sensor 165, such as an AMR sensor or array of AMR sensors. The first magnetic array 155, and second magnetic array 160 are mechanically coupled to each other moving as a single unit. The field sensor 165 is positioned between the magnetic arrays 155 and 160, and senses a differential magnetic field 170 created between the two arrays 155 and 160, as described in greater detail below. The absolute angular position sensing system 150 can also include processing components (such as those shown in FIG. 5), which are capable of receiving and processing signals from the field sensor 165.

In the absolute angular displacement sensing embodiment as depicted in FIG. 1B, the components function to provide a magnetic field direction that changes in proportion to rotary position. In other regards, the function of the magnetic arrays and field angle sensor are substantially identical to that more fully described in the absolute linear position sensing embodiment, FIG. 1A.

FIGS. 2A and 2B illustrate a relative angular displacement sensing system 200, shown assembled as part of a larger device such as steering torque sensing system. The relative angular displacement sensing system 200 includes a first magnetic array 205, a second magnetic array 210, and a magnetic field or field sensor 215. An input shaft 220 and an output shaft 225 are separated by a torque coupling 230. The torque coupling 230 is designed to flex when a torque is applied to either shaft, resulting in an angular displacement between the input shaft 220 and output shaft 225 in proportion to the applied torsional load.

The first magnetic array 205 includes 12 magnetic pole pairs, which alternate between a north pole 235 and a south pole 240. However, in other embodiments, more magnetic pole pairs can be used. In the embodiment shown, the first magnetic array 205 is attached or coupled to the input shaft 220. The second magnetic array 210 also includes 12 magnetic poles pairs, which alternate between a north pole 235 and a south pole 240. The second magnetic array 210 is attached or coupled to the output shaft 225, and is generally aligned with the first magnetic array 205, as shown in FIG. 2A. The field sensor 215, similar to the field sensor 115 shown in FIG. 1A, is positioned between the first and second magnetic field arrays 205 and 210, and therefore, the input and output shafts 220 and 225.

When the input shaft 220 and the output shaft 225 are in a static relationship (e.g., no torque is being applied to the input shaft 220), as shown in FIG. 2A, the poles of the magnetic arrays 205 and 210 are directly aligned to one another. As a result, the orientation of the magnetic fields 245 between the arrays 205 and 210 are also generally aligned (e.g., the magnetic field lines 245 are generally parallel to the arrays 205 and 210). However, when a torque is applied, as shown in FIG. 2B, the input shaft 220 and the output shaft 225 become misaligned about the torque coupling 230, causing the magnetic arrays 205 and 210 to shift with respect to one another. As a result, the direction of the magnetic fields 245 also change.

The magnetic field direction changes described above can be measured using the field sensor 215. For example, as long as the shafts 220 and 225 and the magnetic arrays 205 and 210 do not shift with respect to one another, the average value of Ø between each of the corresponding poles in the magnetic arrays 205 and 210 remains constant. However, when the input shaft 220 rotates, the field angle is shifted (e.g., alternates between Ø and Ø+180). That field angle is measured using the field sensor 215 to provide an indication of the relative angular displacement of the input shaft and the output shaft which is proportional to the amount of torque applied. Measuring relative position in this way can be useful for a variety of applications. For example, the torque created at the steering wheel shaft during maneuvers can be inferred by measuring the relative position change between two torsionally coupled shaft segments. In another embodiment, the torque created within an electric motor or transmission can be inferred in a similar manner. In such embodiments, the field sensor 215 is used to measure the direction change in the magnetic field 245, providing a direct measurement of the angular displacement of the two shafts which is proportional to the amount of torque that is being applied. In contrast to the position sensing embodiment, the angle orientation is the same between all of the corresponding poles between the magnetic arrays 205 and 210. The exact rotational position of the shafts 220 and 225 is generally immaterial to the measurement of torque.

The maximum measurement range in the relative angular displacement embodiment is inversely dependent on the quantity of pole pairs within the magnetic array. The greater the number of pole pairs the smaller the full scale measurement range and visa versa. This relationship can be defined as follows:

Maximum Angular Displacement=±360/(#of Magnetic Pole Pairs)

In FIGS. 2A and 2B, the magnetic arrays 205 and 210 each include 12 pole pairs providing a maximum angular measurement range equal to 30 degrees.

Small differences in spacing between the opposing pole pairs of the magnetic arrays 205 and 210 may generate noise as the orientation of the magnetic field 245 between the corresponding poles varies across the field sensor 215. This noise can increase as the difference between opposing pole pair spacing increases. For example, if the maximum spacing error between opposing pole pairs is equivalent to 2 electrical degrees, and there are 24 pole pairs, the noise error on the torque signal is approximately 2/24 or ±0.083 degrees. However, this error can be reduced by increasing the number of pole pairs in each of the magnetic arrays. In some embodiments, there are 24 pole pairs, but the number of pole pairs may range between about 12 and 36 for typical applications.

FIGS. 3A-3D illustrate computer models 300, 305, 310, and 315, respectively, of a relative angular displacement sensor as would be employed as part of a larger device such as a steering torque sensing system. Each of the models includes an input shaft 320 that is separated from an output shaft 325 by an elastic torque coupling 330. The input shaft 320 and output shaft 325 each include a magnetic array 335 and 340, respectively. In the embodiment shown, each of the magnetic arrays 335 and 340 includes the same number of pole pairs. A four-element AMR sensor array 345 that bridges across the dimension of one pole is positioned above the magnetic arrays 335 and 340. Magnetic field vectors are illustrated by arrows (grouped by dashed line 350).

Figure 3B:
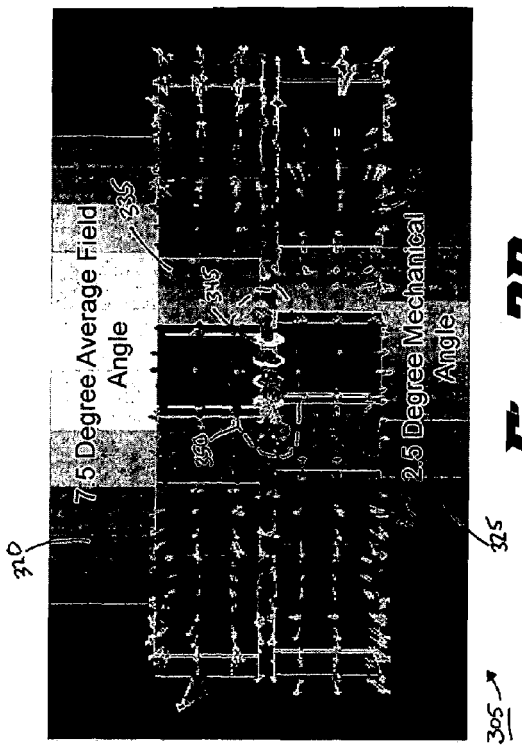
FIG. 3B illustrates another computer model of the relative angular displacement sensor as shown in FIG. 3A.
Figure 3D:
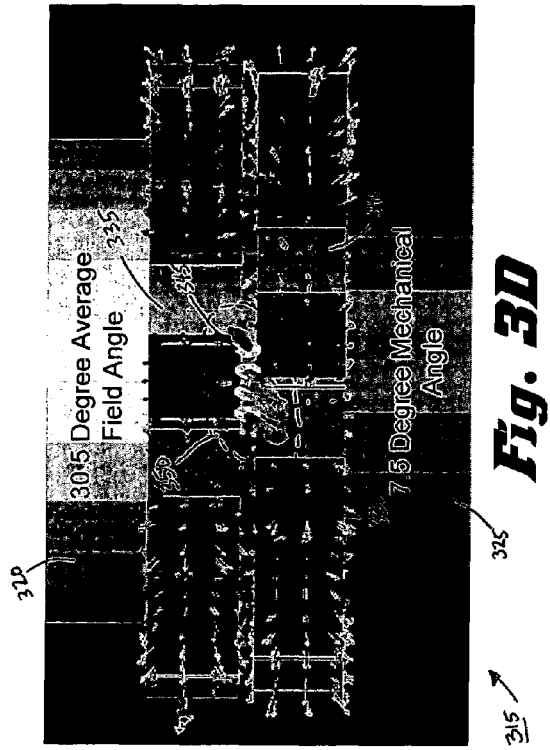
FIG. 3D illustrates still another computer model of the relative angular displacement sensor as shown in FIG. 3A.
Figure 3A:
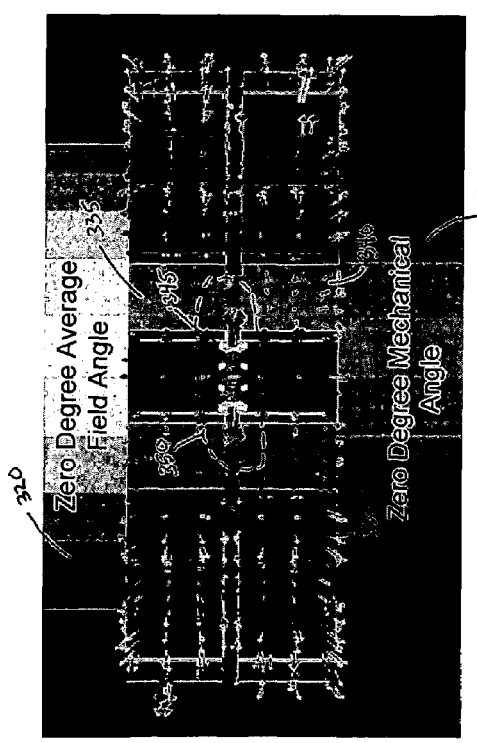
FIG. 3A illustrates a computer model of a relative angular displacement sensor.
Figure 3C:
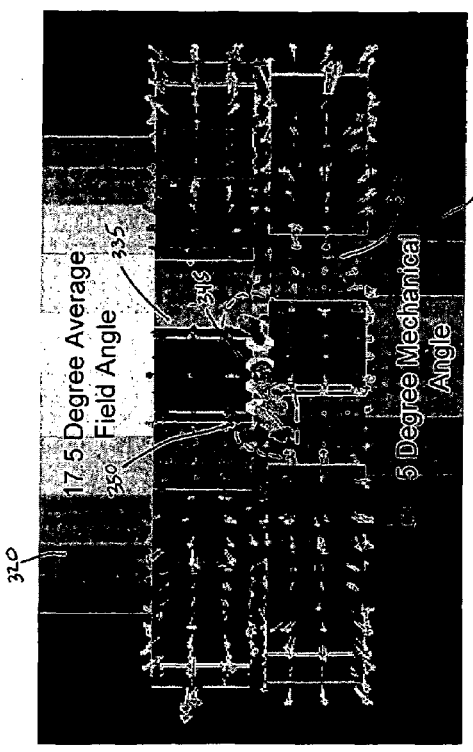
FIG. 3C illustrates yet another computer model of the relative angular displacement sensor as shown in FIG. 3A.

As shown in FIG. 3A, when the magnetic arrays 335 and 340 are aligned, the primary magnetic field direction is perpendicular to the axis of rotation. As a result, the magnetic field vectors 350 in the plane of the AMR sensor array 345 are generally perpendicular along the length of the array. The computer model 300 was generated using twelve pole pairs for each of the magnetic arrays 335 and 340, although arrays with other numbers of pole pairs can be used. Unlike the model 300, the poles of the magnetic arrays 335 and 340 shown in the model 305 (FIG. 3B) are not aligned and are displaced with respect to each other. This type of angular displacement can occur, for example, when a torque is applied to the input shaft 320. The angular displacement of the magnetic arrays 335 and 340 creates a proportional change in the magnetic field vectors 350. As can be seen in FIG. 3B the magnetic field vectors in the plane of AMR sensor array change across the face of the array. The average of this change is proportional to the angular displacement of magnetic arrays 335 and 340. For example, a 2.5 degree angular displacement (i.e., mechanical angle) of magnetic arrays 335 and 340 results in a 7.5 degree average magnetic field angle. Additionally, as shown in FIGS. 3C and 3D, a 5 degree angular displacement results in a 17.5 degree average magnetic field angle, and a 7.5 degree angular displacement results in a 30.5 degree average magnetic field angle, respectively. In other embodiments, the relationship between angular displacement and average magnetic field angle can be different.

The models 300-315 generally illustrate that the displacement of two multi-pole magnets in proximity to each other creates a differential magnetic field vector direction that changes in relationship to the angular displacement of the magnetic arrays with respect to each other. Additionally, the average of the absolute value of the differential magnetic field direction in the plane parallel to and along the axis of motion of the shafts 320 and 325 is proportional to the displacement of the shafts 320 and 325.

Figure 4A:
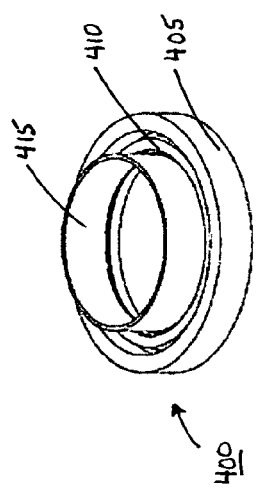
FIG. 4A illustrates a ring magnet.
Figure 4C:
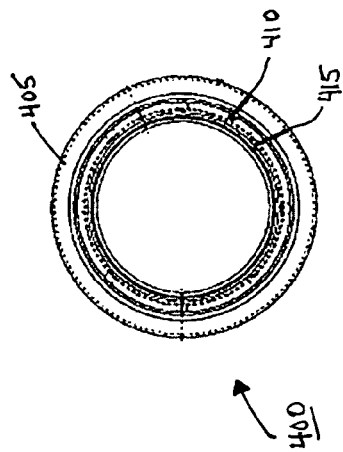
FIG. 4C illustrates a top view of the ring magnet shown in FIG. 4A.
Figure 4B:
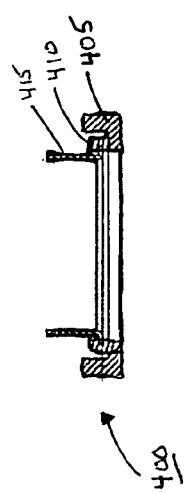
FIG. 4B illustrates a cross-sectional view of the ring magnet shown in FIG. 4A.

FIGS. 4A, 4B, and 4C illustrate one embodiment of a ring magnet or magnetic array collar 400, which can be used to implement the models 300 and 350. The collar 400 includes a plurality of magnets 405, a magnet/bushing interface 410, and a bushing 415. Two magnetic array collars 400 can be positioned opposing each other, with the poles of the magnets 405 generally aligned to create relative angular displacement sensor (such as that shown in the models 300-315).

The absolute angular position sensors and the relative angular displacement sensors described herein utilize the differential magnetic fields that result from positioning two multi-pole magnets in a close proximity to one another. Thus, in one embodiment, the absolute angular position sensor 100 and relative angular displacement sensor 200 can be combined into a single sensing module or apparatus. FIG. 5 illustrates an absolute position and torque sensing apparatus 500 that includes a position magnetic array 505, a dual function torque/position magnetic array 510, a second torque sensing magnetic array 515, a first field direction sensor 520 (that senses magnetic field direction used to determine absolute position), and a second field direction sensor 525 (that senses magnetic field direction used to determine torque). The array 505 and the array 510 are positioned on an input shaft 530 (or, more broadly a rotational platform). The array 515 is positioned on an output shaft 535 (also a rotational platform). A torsional coupling, not shown, is used to couple the input shaft 530 and output shaft 535 such that a torsional load will cause an angular deflection to occur between the two shafts 530 and 535. The position and torque sensing apparatus 500 also includes a position processing module 537 and a torque processing module 539.

As shown in FIG. 5, each of the magnetic arrays 505, 510, and 515 are positioned generally proximate to each other. In one embodiment, the position magnetic array 505 is positioned at one end of the three array combination, and includes one more pole pair than the torque/position magnetic array 510 and the torque array 515. The first field sensor 520 measures the magnetic field direction angle between the position magnetic array 505 and the first torque/position magnetic array 510, the absolute value of which changes proportionally with the angular displacement of the input shaft 530.

Information sensed by the first field sensor 520 is provided to the position processing module 537. The position processing module 537 includes a housing 540 to protect the magnetic field sensor 520 from the environment (e.g., dust, moisture, etc.). The position processing module 537 also includes a connector 545, which may include pins or other electrical connections to support the transmission of power and data. In some embodiments, the module 537 includes a printed circuit board 550, which may hold the first field sensor 520, a signal conditioning ASIC (not shown), and other components, such as an EMI filter (not shown).

The torque/position magnetic arrays 510 and torque magnetic array 515 include an identical number of poles. The second field sensor 525 measures the changing magnetic field direction between the poles of the torque/position magnetic arrays 510 and torque magnetic array 515 when the input shaft 530 angular position moves with respect the output shaft 535. The second field sensor 525 can be arranged within the torque processing module 539, which, similar to the position processing module 537 described above, includes a housing 555, a connector 560, and a printed circuit board assembly 565.

An embodiment combining the absolute angular position sensor 100 and the relative angular displacement sensor 200 (such as the position and torque sensing apparatus 500) has the potential to simplify installation and lower the overall electric power steering system cost. Other applications for the position absolute angular position sensor 100 and the relative angular displacement sensor 200 exist. For example, embodiments of an absolute angular position sensor may be used for determining motor position in precision brushless DC motor commutation systems. Advanced engine controls may use a relative angular displacement sensor to monitor torque in support of electronic engine control algorithms. Absolute and relative position sensors may also be used in 1) seat belt retractors for advanced safety restraints and belt tension control; and 2) drive-by-wire systems to sense pedal and throttle positions for electronic engine control. Other applications and embodiments of the invention may include clutches for drive wheels and transmissions. Industrial equipment that requires position control and torque sensing may also find applications for position and torque sensing systems implemented with embodiments of the invention.

Various features and aspects of embodiments the invention are set forth in the following claims.

What is claimed is:

1. A sensor comprising:
   a first array of M magnetic pole pairs, where M is a positive number;
   a second array of N magnetic pole pairs, arranged substantially in parallel to and mechanically coupled to the first array, where N is a positive number different than M, to form a first magnetic field between the first and second arrays that changes orientation in respect to position;
   a first field sensor positioned adjacent and between the first array and the second array; and
   a third array of N magnetic pole pairs and a second field sensor, wherein the third array is located adjacent to the second array to form a second magnetic field in between the second and third arrays that changes orientation with respect to a displacement between the second and third arrays and wherein the second field sensor is located adjacent and between the second array and the third array.

2. A sensor comprising:
   a first array of N magnetic pole pairs, where N is a positive number greater than one;
   a second array of N magnetic pole pairs, the second array positioned to form a magnetic field between the first and second arrays that changes orientation in respect to a displacement between the first and second arrays;
   a field sensor positioned adjacent and between the first array and the second array, and configured to measure the magnetic field between the first array and the second array; and
   an element configured to average output of the field sensor over a distance;
   wherein the field sensor is a four-element sin/cos AMR sensor.

3. A sensor comprising:
   a first array of M magnetic pole pairs, where M is a positive number;
   a second array of N magnetic pole pairs arranged substantially in parallel to and mechanically coupled to the first array to form a magnetic field between the first and second arrays that changes orientation in respect to position, where N is a positive number different than M;
   a third array of N magnetic poles pairs arranged substantially in parallel with the second array;
   a first field sensor positioned adjacent and between the first array and the second array; and
   a second field sensor positioned adjacent and between the second and third array.

4. The sensor as claimed in claim 3, wherein an angular orientation of the magnetic field formed between the first array and the second array has a unique angular orientation at any point between the first array and the second array.

5. The sensor as claimed in claim 3, wherein a change in an angular orientation of a magnetic field formed between the second array and the third array relates to a displacement between the second and third array.

6. The sensor as claimed in claim 3, wherein the first and second field sensors are AMR sensors.

7. A sensor comprising:
   a first array of M magnetic pole pairs connected to a first rotational platform, where M is a positive number;
   a second array of N magnetic pole pairs connected to the first rotational platform and arranged substantially in parallel to the first array to form a magnetic field between the first and second arrays that changes orientation in respect to a position of the rotational platform where N is a positive number different than M;

a third array of N magnetic pole pairs connected to a second rotational platform, wherein the third array is located adjacent to and substantially in parallel with the second array;

a first field sensor positioned adjacent and between the first array and the second array; and a second field sensor positioned adjacent and between the second and third array.

8. The sensor as claimed in claim 7, wherein an angular orientation of the magnetic field between first array and the second array has an unique angular orientation that indicates a rotational position of the first rotational platform.

9. The sensor as claimed in claim 7, wherein a change in an orientation of a magnetic field formed with respect to the second and third arrays relates to a difference in angular displacement between the first and second rotational platforms.

10. The sensor as claimed in claim 7, wherein the first rotational platform is an input shaft in power steering system.

11. The sensor as claimed in claim 7, wherein the second rotational platform is an output shaft in power steering system.

12. The sensor as claimed in claim 7, wherein M=N+1 or N−1.

13. A method of sensing changes in a magnetic field, the method comprising:

providing a first array of M magnetic pole pairs, where M is a positive number;

arranging a second array of N magnetic pole pairs, substantially in parallel to and to move in concert with the first array, where N is a positive number different than M;

arranging a first field sensor between the first and second arrays;

sensing changes in orientation of a magnetic field between the first and second arrays as the first and second arrays and the first field sensor more relative to one another; and providing a third array of N magnetic pole pairs substantially in parallel to and to move independently of the first and second arrays;

arranging a second field sensor between the second and third arrays; and sensing an angular orientation of a magnetic field formed between the second and third arrays.

* * * * *